Jan. 21, 1958  P. W. BROWER  2,820,375
FORMING GLASS MOLDING TOOLS
Filed Dec. 22, 1954  2 Sheets-Sheet 2
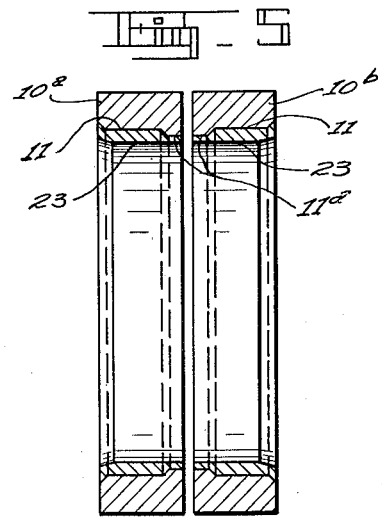
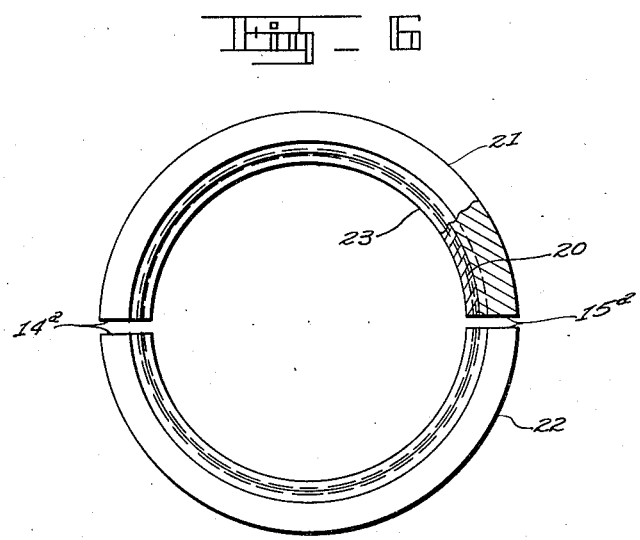
INVENTOR.
PAUL W. BROWER
BY

United States Patent Office 2,820,375
Patented Jan. 21, 1958

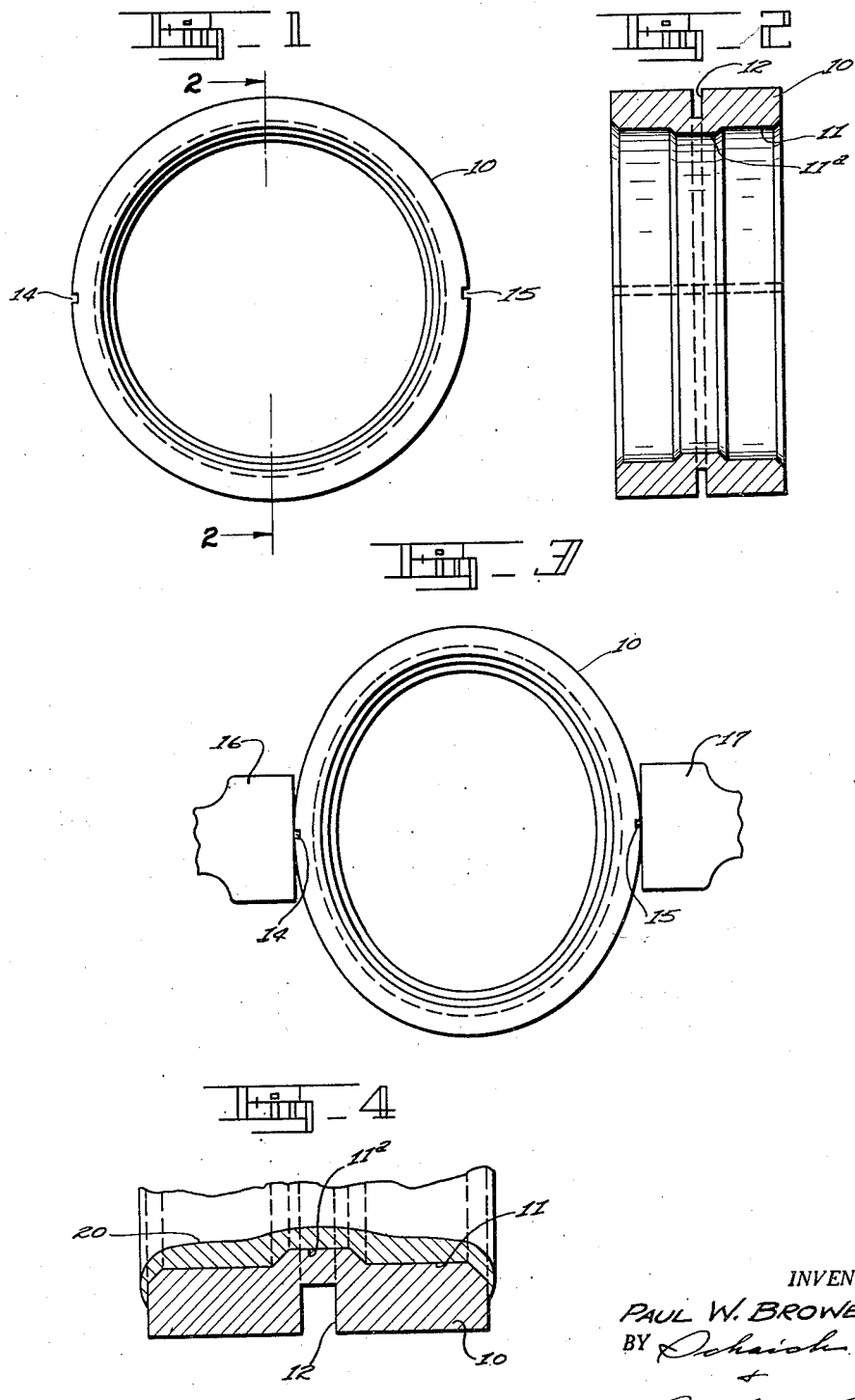

2,820,375
FORMING GLASS MOLDING TOOLS

Paul W. Brower, Toledo, Ohio, assignor to Owens-Illinois Glass Company, a corporation of Ohio Application December 22, 1954, Serial No. 477,064

7 Claims. (Cl. 76—107)

My invention relates to the forming of molding tools for use in the molding of molten glass or other materials which under high temperature molding conditions subject the forming tools to highly abrasive or detrimental action. Various types of shaping and forming tools may be made in accordance with this invention but as illustrative of the procedure it will be considered as utilized in the forming of glass shaping tools such as are used on automatic molding machines. For example, a neck mold, a blowing mold, parison mold, or a forming or shaping plunger.

In tne drawings there has been illustrated the application of this invention to a molding element commonly known as a neck or finishing molding element as is used in many of the well known automatic glass shaping and forming machines.

It is an object of this invention to provide a glass shaping member so constructed as to withstand the effective abrasive action of molten glass and in particular when the shaping or molding member is operated at a high temperature.

It is a further object to provide such a shaping member with a coating which is highly resistant to abrasive or erosive action at high temperature.

Another object is to provide such a coating on a shaping member in such manner as the coating becomes an integral part of the member. Other objects will be apparent in the following descriptive matter.

In the drawings,

Fig. 1 is a plan view of the blank used in the forming of a neck or finish shaping member.

Fig. 2 is a cross-sectional elevational view taken at line 2—2 on Fig. 1 illustrating one form of an internal holding or retaining contour upon which coating will be applied.

Fig. 3 is a plan view illustrating the one form of partially flattening or slightly collapsing the circular members.

Fig. 4 is a partial cross-sectional view showing the applied coating.

Fig. 5 is a cross-sectional view showing the rings separated into two annular ring portions, and Fig. 6 shows the ring members separated into semi-circular form.

In this present invention, it is the primary desire to have or make a glass shaping tool wherein the surfaces utilized for shaping the molten glass are provided with surface coatings of a form of hard material resistant to corrosion and abrasion at elevated temperatures. Such materials also have the characteristic of improving the quality of releasing the glass from the mold contact and are particularly desired on the glass contacting surface areas.

Such coatings may be applied by the ordinary flame spraying process followed by the fusion of this flame sprayed material to the base material either by the application of a flame torch, a furnace, induction heating or such other means as might fuse the two materials together.

Such a procedure is designed particularly for the obviating of porous materials which of course are ruinous in the shaping of molten glass.

In this process of manufacture of surface coated mold parts, it is proposed to perform the coating operation, for example, on the inside of a tubular or cylindrical shaped piece of stock, the inside surface which has been contoured in a manner conducive to the holding or retention of the coating material. After the coating has been flame sprayed into this tubular section and fused thereto, the tubular section may be cut either by machining or by transverse saw cutting and made into several matching pieces suitable for forming individual mold parts.

In the normal procedure in this invention, the tubular section as shown in Fig. 2, will be compressed slightly, as is shown in exaggerated form in Fig. 3, then it will be sand blasted on its inner surface contours. Following the sand blasting, hard cutting material, such as the well known Colmonoy or other chrome, nickel, boride coatings will be flame sprayed on this internal surface area and then the sprayed form will be subjected to a temperature sufficiently high to fuse the surface coating material and the base member together. Thereafter, the parts will be severed first to form two annular members and then these annular members separated to form individual semi-circular members.

Thereafter, these semi-circular members are held in aligned relationship to form a complete circle and the desired molding contour will be ground or formed into the coating material. Thus, a split mold type of finish may be readily formed and of course, if a solid single piece finish is desired the annular members need not be parted or segregated into these mentioned halves.

Referring to the drawings, an annular hollow base member 10 is provided with a machined contour 11 having a shoulder portion 11a, on its inner cylindrical surface area and a groove 12 is provided on the outer surface of the annular member 10. Said groove extending from the outer surface of member 10 through a major portion of the wall thickness of this annular member 10 and throughout the circumference thereof. Additional shallow grooves 14 and 15 positioned in opposing relation extend along the length of the outer surface area of the annular member 10 and provide indicating marks for the eventual flattening and separation of this annular member into halves.

In Fig. 3, there has been shown, in highly exaggerated form, the slight compression of the annular member 10 toward an elliptical form or shape such pressure being applied at or near the transverse groove 14 and 15 by pressure members 16 and 17 opposing each other. Actually, the compression at this point is on the order of from .025 to .045 of an inch. The purpose of such compression of the annular member is to provide a condition whereby when these annular members are completely severed through the cuts 14 and 15 there will be provided semi-circular members. The resultant semi-circular members will then be approximately true semi-circular members.

After the flattening operation the internal contour 11 and 11a is grit blasted with approximately a number 6 steel grit to provide an upset on the smooth machined surface which upset will in turn provide a more ready adhesion surface for the later applied coating. It is imperative that this blasted surface be not contaminated before the application of the hard surface material. This sand blasted ring may then be mounted in the chuck of a lathe and the grit blasted surface will then be sprayed with a flame spray metalizing gun to apply a coating of Colmonoy or another hard surfacing material 20 thereon, such as indicated in Fig. 4.

With the annular member coated with hard surfacing material as shown in Fig. 4, it is expedient to determine whether or not the coating is in complete solid form or whether some porosity has formed during the spraying operation. Therefore, the annular member 10 is completely severed along the previously formed groove 12 to form thereby two separate annular members to thereby permit inspection of the surfacing material 20 along the severed line 12. If it is found that the coating material is solid then the further operations necessary to the finishing of the shaping member may proceed.

In this manner, a check may be maintained on the uniformity of the deposition of surfacing material along the internal surface area of the annular member 10.

With the separation of the annular member 10 into two separate annular members there is thereby formed members 10a and 10b. These annular ring members are then split through shallow grooves 14 and 15 to form two sets of separate and distinct semi-circular ring members 21 and 22. This separation permits a further inspection of the sprayed coating for porosity. The ends 14a and 15a of these semi-circular members 21 and 22 are then ground so that when brought into physical contact they have matching surfaces at this point. A pair of these halves are then brought into matching engagement and mounted in the chuck of a finishing machine which grinds a contour 23 in the coating 20.

From the preceding, it should be apparent that there is thus provided a glass forming or shaping tool, the shaping surface of which is provided with a hard surfacing material highly resistant to abrasion at high temperatures and conducive to easy release from glass.

It is to be understood that this method of making neck molds is not limited to the particular illustrated tool but may be applied to other tools.

Modifications may be resorted to within the spirit and scope of my invention.

I claim:

1. The method of forming a glass shaping tool which comprises the steps of forming a circular metal blank, providing a metal holding surface on the inner areas of said blank, upsetting said surface, deforming the circularity of said blank, coating said upset surface with a hard material, subjecting said blank and material to a temperature sufficient to join them into an integral member, splitting said blank and forming a glass shaping contour in said hard material.

2. The method of forming a glass shaping tool which comprises the steps of forming a circular metal blank, providing a metal holding surface on the inner surface areas of said blank, upsetting the said metal holding surface areas, deforming the circularity of said blank, coating said upset surface areas with a hard metal alloy, subjecting said blank and alloy to a temperature sufficient to fuse them into an integral member, splitting said blank and grinding an article shaping contour in said hard coating.

3. The method of forming glass shaping tools which comprises the steps of forming a metal blank, providing a metal holding contour on one surface of said blank, upsetting the surface of said metal holding contour, coating said upset surface with a hard metal alloy, subjecting said blank and alloy to a temperature sufficient to fuse them into an integral member, splitting said blank along longitudinal and transverse lines to form semi-circular matching parts, aligning at least two of said matching parts, and forming a glass shaping contour in said hard alloy.

4. The method of forming glass shaping tools which comprises the steps of forming a metal blank, providing a metal holding contour on the glass contacting side of said blank, upsetting the surface of said metal holding contour, coating said upset surface with a hard metal alloy, subjecting said blank and alloy to a temperature sufficient to fuse them into an integral member, splitting said blank along longitudinal and transverse lines to form semi-circular matching parts, aligning at least two of said matching parts, and grinding a glass shaping contour in said hard alloy.

5. The method of forming glass shaping tools which comprises the steps of forming a hollow circular metal blank of a length in excess of that required for a single tool, providing a metal holding contour on the inner surface of said hollow blank, slightly flattening the circularity of said blank, upsetting the surface of said metal holding contour, coating said upset surface with a hard metal alloy, subjecting said blank and alloy to a temperature sufficient to fuse them into an integral member, splitting said blank along longitudinal and transverse lines to form set of matching parts, aligning at least two of said matching parts, and grinding a glass shaping contour in said hard alloy of said matched parts.

6. The method of forming a plurality of glass shaping tools which comprises the steps of forming a hollow cylindrical metal blank, providing a shouldered contour on the inner surface of said blank, subjecting said cylindrical blank to an external flattening pressure, upsetting the surface of said shouldered contour, coating said upset surface with a chrome, nickel, boride alloy, subjecting said blank and said alloy to a temperature sufficient to fuse them into an integral member, separating said cylindrical member into a plurality of sets of semi-circular members, matching at least a pair of said semi-circular members, and grinding a glass shaping contour in said hard coating of said semi-circular members.

7. The method of forming a glass shaping tool which comprises the steps of forming a cylinder like metal blank, providing a metal holding and retaining surface on the inner surface areas of said blank, upsetting the surface of said holding and retaining areas, coating said upset surface with a hard metal alloy, subjecting said blank and alloy to a temperature sufficient to fuse them into an integral member, splitting said blank to form matching parts, and grinding a glass shaping contour in the hard coating of said matched parts.

References Cited in the file of this patent

UNITED STATES PATENTS

| | | |
|---|---|---|
| 1,864,590 | Fiefield | June 28, 1932 |
| 2,258,894 | Janco | Oct. 14, 1941 |
| 2,361,962 | Ronay | Nov. 7, 1944 |
| 2,423,857 | Talmage | July 15, 1947 |
| 2,494,970 | Shea | Jan. 17, 1950 |
| 2,588,422 | Shepard | Mar. 11, 1952 |
| 2,626,221 | Elliott | Jan. 20, 1953 |